Oct. 20, 1953

H. ZIEBOLZ 2,655,902

SYSTEM FOR PROPORTIONING FLUID FLOW
TO CONTROL SIGNAL MAGNITUDE
Filed Dec. 22, 1949

INVENTOR.
Herbert Ziebolz
BY
Att'ys

Patented Oct. 20, 1953

2,655,902

UNITED STATES PATENT OFFICE 2,655,902

SYSTEM FOR PROPORTIONING FLUID FLOW TO CONTROL SIGNAL MAGNITUDE

Herbert Ziebolz, Chicago, Ill., assignor to Askania Regulator Company, Chicago, Ill., a corporation of Illinois Application December 22, 1949, Serial No. 134,484

10 Claims. (Cl. 121—38)

1

The present invention relates to fluid, and particularly hydraulic systems of the type comprising a movable control input member that actuates a device controlling volume rate of flow of a controlled fluid, and is directed to the particular problem of producing a volume rate of flow that is accurately determined by the magnitude of a signal applied to the input member, and that is unaffected by the resistance to flow offered by a load, which may be variable.

In the past, several methods of accomplishing this proportional flow control have been used. The present invention is based on a concept that is basically different from that of any of these methods. It provides a simple and accurate method and means for continuously proportioning volume flow rate of a controlled fluid to magnitude of a controlling signal, by providing means independent of the pilot valve with respect to throttling action of the latter, but sensitive to pilot valve position and determining flow rate through the pilot valve in accordance with such position.

A primary object of the invention is to provide a novel, simple and accurate method of proportioning volume rate of flow of a controlled fluid to magnitude of a controlling signal.

A second object is the provision of a novel, simple and accurate method and apparatus for proportioning volume flow rate of a controlled fluid to degree of movement of a pilot valve.

Another object is to provide such a method that can be performed by relatively simple and inexpensive apparatus.

Another object is to provide simple and inexpensive apparatus for performing such a method.

An additional object is the provision of a novel device cooperative with a conventional pilot valve of sensitive type and operating within a very limited range of movement, serving to accurately multiply such movement to a magnitude suitable for operating a device requiring substantial degree of movement, typically a valve, a variable flow orifice, or other volume flow rate-controlling, selecting or measuring device.

A further object is to provide apparatus for proportioning volume flow rate of a controlled fluid to magnitude of a control signal, including such a novel motion-multiplying device.

A still further object is the provision of novel means for accurately determining rate of operation of a fluid piston motor by magnitude of a control signal applied to a fluid control relay.

In the accompanying drawings:

Fig. 1 is a schematic diagram of a signal con-

2 trolled hydraulic power unit system including an embodiment of the invention.

Figure 1:
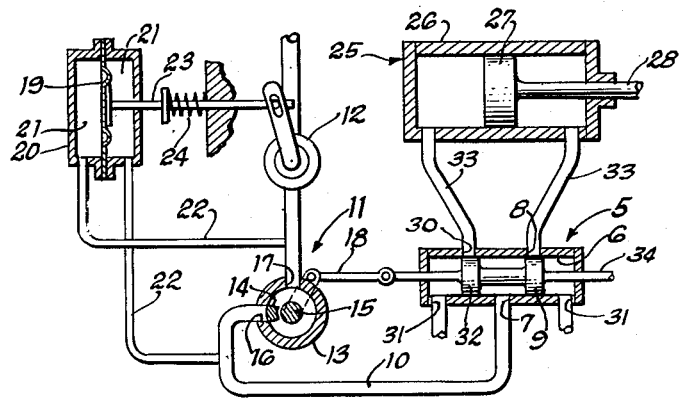

Referring to Fig. 1, the numeral 5 indicates a fluid flow-controlling pilot valve casing enclosing a cylindrical bore 6 into which opens a supply port 7 and an outlet port 8 axially displaced therefrom. In bore 6 is an axially slidable valve body 9 movable to control outlet port 8 and thereby control flow of fluid delivered through such port. It is a well-known characteristic of pilot valve-controlled systems, typified by the construction described, that volume rate of fluid delivered from a constant pressure supply may not be linearly proportional to degree of displacement of the valve body from a zero position, wherein communication between supply and delivery ports is blocked by the body, particularly under variable load conditions.

In Fig. 1 the arrangement embodying the invention comprises, in series connection in the flow path to the pilot valve, indicated by conduit 10, a variable orifice device 11 and a flow rate-controlling valve 12. The variable orifice device may be any of the suitable known types and is disclosed as comprising a housing 13 enclosing a space wherein is rotatable a wedge-shaped body 14 extending to one side of an operating shaft 15 to control the area of an outlet or orifice forming port 16 to which the fluid is supplied through the interior of the casing from an entrance port 17.

The effective area of the flow-restricting aperture defined by the edges of the port 16 and of the body 14 is determined by the position of the body 14. As suggested in my prior United States Patent No. 2,074,883, the edges defining port 16 may be contoured in the directions of movement of body 14 to provide a desirable functional relation between effective area of the aperture and position of the body 14. This contour also may be such as to compensate the second power relation between flow rate and differential pressure developed across a restriction.

The body 14 is mechanically connected to the pilot valve 9 by suitable linkage through which the position of the body 9 determines the angular position of the body 14 relative to orifice 16. This linkage is such that the distance of the body 14 from a zero position, shown in Fig. 1 as completely eliminating passage of fluid through the variable aperture assembly, but which may be arranged to provide a minimum aperture area, is proportional to distance of the pilot valve body 9 from its zero position, and variations in position of bodies 14 and 9 are proportional. In Fig. 1 such linkage is shown as a linear-to-rotary motion-translating assembly 18 connecting shaft 15 to valve body 9 for proportioning rotary movement of orifice-controlling body 14 to linear movement of body 9.

To proportion volume flow rate to distance from zero position of the variable orifice body 14, and consequently to distance of the valve body 9 from its zero position, a well-known regulator is employed to control the flow-regulating valve 12. This regulator comprises a differential pressure-sensitive motor in the form of a flexible diaphragm 19 enclosed by a housing 20 that forms chambers 21 on opposite sides of the diaphragm. Chambers 21 respectively are connected by pipe lines 22 to the supply conduit 10 on opposite sides of the variable orifice. A connecting rod 23 actuated by diaphragm 19 is connected to operate valve 12. A return spring 24 is arranged to load the diaphragm 19. This arrangement is such as to maintain the pressure drop across the variable orifice substantially constant and thereby maintain constant the flow rate for a given position of the pilot valve body. Differential pressure across the orifice, being functually related to rate of flow as well as to effective orifice area, upon departure of the differential pressure from a predetermined magnitude selected by the setting of loading spring 24, diaphragm 19 will adjust valve 12 to re-establish the predetermined differential pressure by suitably altering the rate of flow through the orifice. Thus, since flow-rate control is accomplished by adjusting it to maintain a constant pressure drop across the orifice assembly 11, and the area of the orifice restriction is proportioned to degree of displacement of the pilot valve body, the flow rate is directly controlled by such degree of displacement and consequently by signal magnitude.

A very valuable feature of the arrangement described above is that the selected volume rate of flow is maintained by the variable orifice and differential pressure-sensitive mechanism regardless of variation of the load resistance to which is applied the energy of the controlled fluid. To emphasize this characteristic of the system, it is shown as controlling delivery of operating fluid to a hydraulic motor assembly 25 comprising a cylinder structure 26 and a piston 27 axially movable therein for delivery power through a piston rod 28.

To accomplish selection of direction of operation of piston 27 the pilot valve is provided, in addition to supply and delivery ports 7, 8, with a second delivery port 30 axially spaced from port 8 to the opposite side of port 7, a pair of exhaust ports 31 and a second valve body 32, thus comprising a conventional four-way spool-type pilot valve assembly. The delivery ports 8, 30 are connected to cylinder 26 on opposite sides of piston 27 by lines 33 so that direction of travel of the piston is selected by direction of displacement of the assembly of bodies 9, 32 from its zero position shown in Fig. 1, blocking flow between all of the valve ports. Position of the pilot valve body assembly 9, 32 may be selected by an operating rod 34 to which a control signal is applied by a suitable system. From the above description of the arrangement of the variable orifice assembly 11 and flow-control valve 12, it will be seen that rate of supply of operating fluid to the cylinder 26, and consequently travel rate of piston 27, will be maintained accurately proportional to the distance of the pilot valve body assembly 9, 32 from its zero position. In the system of the present invention the function of the pilot valve is only to direct flow to either side of the piston, rather than to control its flow by throttling action.

Figure 3:
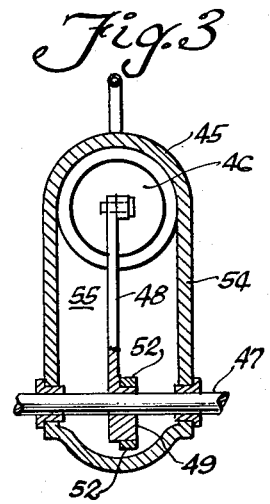
Fig. 3 is a section on line 3—3 of Fig. 2.
Figure 2:
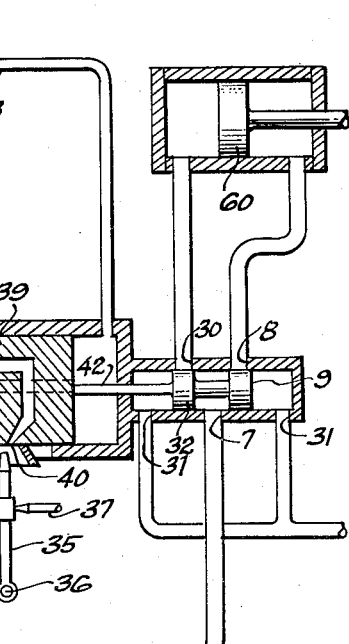
Fig. 2 is a partial diagram showing a preferred form of motion-multiplying apparatus forming a part of the invention, and illustrating the manner of use of such apparatus in a system arranged according to the invention.

This proportional relation between pilot valve body position and variable orifice area-controlling body may be established and maintained even though the pilot valve has high sensitivity and its control operation is performed by movement of its flow-control body in a very limited distance range. To illustrate this characteristic, and while the pilot valve may be actuated by any sort of signal system, it is shown in the arrangement of Figs. 2 and 3 as being operated by a jet pipe and auxiliary piston type of relay, in itself a well-known and highly satisfactory arrangement for hydraulic control. The relay comprises a jet pipe 35, pivoted to swing about an axis 36, and to which a control signal is applied by suitable mechanism such as an axially movable rod 37. A signal so applied deflects the jet pipe from a zero position to a degree determined by magnitude of the signal, and variations in signal magnitude proportionally vary the degree of jet pipe deflection. An auxiliary piston assembly comprises a cylinder 38 wherein is axially movable the auxiliary piston 39. Piston 39 has therein a pair of closely adjacent axially spaced distributor ports 40 that are cross-connected by passages to opposite ends of the piston. The relay arrangement is such that with piston travel the ports 40 move in the directions of swing of the jet pipe. They are exposed, to receive the fluid jet delivered by the pipe 35, through an opening 41 in the cylinder wall. In operation, deflection of the jet pipe creates, through unequal delivery of fluid to the ports 40, an unbalance in pressures at the opposite ends of the piston, moving the latter in the direction of jet pipe deflection until balance of pressures is established by equal delivery of fluid to the two distributor ports. Thus the auxiliary piston closely and accurately follows the jet pipe as the latter is swung by signal variations and its distance from a zero position, corresponding to zero deflection of the jet pipe, is proportional to magnitude of the signal applied to the latter.

The auxiliary piston 39 is connected to the pilot valve, to which the same numerals are applied as in Fig. 1 in such way that zero position of the latter corresponds to zero position of the jet pipe. Such connection is shown in Fig. 2 as a simple axially movable rod 42.

A characteristic of a jet pipe, auxiliary piston and pilot valve relay is extreme sensitivity, the movement of the auxiliary piston, and therefore that of the pilot valve, being restricted to a range of the order of fifty one-thousandths of an inch in each direction from zero position. For satisfactory operation of such a device as a variable orifice, especially a variable orifice used to maintain accurate control of volume flow rate by such a system as disclosed in Fig. 2, a much greater range of movement may be desirable.

A device for accurate multiplication of the stroke of an auxiliary piston by a large factor is shown in Figs. 2 and 3. A problem involved in multiplication of movement of a jet pipe operated auxiliary piston is that the small areas of piston ends in normal sizes of such devices limit the power output of the pistons. The device of Figs. 2 and 3 provides auxiliary power exerted to assist the auxiliary piston, but in an accurately controlled fashion avoiding introduction of error into the output stroke of the device. The device comprises an assisting or second cylinder 45, the axis of which is displaced from that of the auxiliary cylinder 38 in such arrangement that the stroke of a piston 46 in the second cylinder is convertible to a motion corresponding in magnitude to magnitude of the stroke of auxiliary piston 39, and the force of which can be exerted to aid auxiliary piston 39.

In the arrangement shown, the second cylinder 45 is displaced laterally from the auxiliary piston cylinder 38, and additionally the inner or adjacent ends of the cylinders are axially spaced. Linkage is provided connecting both pistons for cooperative operation of an output member, shown as a shaft 47 rotatably mounted in bearings carried by casing walls of the assembly. The specific arrangement of linkage connecting the output member to the two pistons depends on the specific arrangement of the cylinders, being such that the magnitude of a long stroke performed by the second piston is proportional to magnitude of a short stroke performed by the auxiliary or first piston. Advantageously this proportioning of strokes is accomplished by exerting the forces developed by the two pistons at different radial distances from the axis of rotation of the output member, through eccentric means.

In the particular arrangement of Figs. 2 and 3, the rotary shaft is arranged at a location between the planes of the inner cylinder ends, and is located much closer to the axis of the auxiliary piston cylinder 38 than to that of the second cylinder 45. A lever arm-providing assembly comprises a lever 48 extending radially of shaft 47 in the direction of the axis of the second cylinder 45, and a circular eccentric 49 extending radially opposite such lever. A connecting rod 50 links the lever 48 to the piston 46, and a connecting rod 51, provided with a strap 52 encircling the eccentric 49, links the latter to the auxiliary piston 39. The radial distances from the axis of shaft 47 at which the pistons are connected to the lever arm members 48, 49 are such as to proportion the strokes of the respective pistons.

Corresponding ends of the cylinders, with respect to direction of piston movement to rotate the output member, are interconnected. Thus in Fig. 3, wherein cylinders 38 and 45 are located to opposite sides of shaft 47, and exert force on lever arms extending to opposite sides of the shaft, the outer or non-adjacent ends of the cylinders are interconnected by a conduit 53 providing a passage for fluid from the end of cylinder 38 to the corresponding end of cylinder 45. Communication between the inner or adjacent cylinder ends conveniently is afforded by a casing structure 54 enclosing a chamber 55 into which the inner ends of both cylinders open. Conveniently the lever arm eccentric mechanism is located within chamber 55. The output shaft 47 extends through chamber 55 and one or both ends project therefrom through a suitable sealing bearing arranged in the casing structure, as appears in Fig. 3.

In operation, assuming jet pipe 35 to be deflected counter-clockwise as seen in Fig. 2, pressure in the outer ends of both cylinders will exceed pressure in the inner ends and both pistons will move inward, toward the shaft. Since the pistons are linked together through the linkage 50, 48, 49, 51, their movement always is directly proportional, as determined by the relative lengths of the lever arms provided by lever 48 and eccentric 49. Hydraulic locking due to the unequal strokes of the pistons is prevented by the relief afforded corresponding ends of both cylinders by the distributor port 40 that is at the lower pressure. Movement of the pistons continues, with piston 46 aiding piston 39 to overcome the resistance to movement of the latter due to the very short lever arm through which it operates. The extremely short character of such lever arm is necessary because of the very restricted range of movement of the auxiliary piston. When such movement has advanced to a point at which the distributor ports receive equal proportions of fluid delivered by jet pipe 35, when the distance of movement of the auxiliary piston equals degree of jet pipe deflection, piston motion stops. By this arrangement the angular position of shaft 47 is maintained in correspondence with that of the jet pipe, and with magnitude of signal applied to the jet pipe. Obviously the degree of rotation of shaft 47, corresponding to a given distance of movement of auxiliary piston 39, may be varied within the limits of reasonably accurate relation between rectilinear and rotative movement translated by an eccentric, and is determined by the effective length of the lever arm that is linked to the auxiliary piston.

The extending end of shaft 47 is connected to the rotatable body of a variable orifice assembly 56 across which is connected a flow volume rate-regulating, differential pressure-sensitive motor assembly. Such assembly comprises a diaphragm 57, chambers 58 on opposite sides of which are connected to the downstream and upstream sides of the variable orifice assembly. Diaphragm 57 controls a flow-regulating valve 59 to maintain flow rate at a value to maintain at a constant level the differential pressure across the orifice.

The system is shown as controlling a motor piston 60 to maintain its rate of travel proportional to magnitude of a signal causing such deflection. In view of the reversible character of the servomotor in each of the system of Fig. 1 and that of Figs. 2 and 3 and the movement of the pilot valve in either direction from a center zero position, the variable orifice in each system is so arranged as to provide increasing orifice area for either direction of operation. To accomplish this, in Fig. 2 the body 14 is of such size and angular disposition as to increase the area of port 16 in rotating in either direction from a zero position. In the variable orifice assembly 56 of Fig. 2, a rotary body 62 is arranged with a central part 63, the opposite edges of which define one edge of the orifice, depending on the direction in which the body 62 is turned, a passage 64 being disposed on each side of said portion for forming an aperture that increases in area as the body 62 is turned from its zero position. The body 62 is arranged in a casing 65 having an inlet port 66 the edges of which cooperate with one or the other edge of the portion 63 to define the area of the orifice. Connection of body 62 with the output shaft 47 of the motion-multiplying device is indicated by the dotted line 67.

The arrangement of Fig. 2 operates on the same basic principle as the system of Fig. 1, which is control of rate of flow by a secondary device that is sensitive to degree of movement from zero position of a primary flow control device. The system of Fig. 2 constitutes a development permitting the very useful features of the system to be taken advantage of where the movement of the primary flow control device is restricted to a very limited range.

Although a spool type pilot valve has been used for purposes of the present disclosure it will be obvious that a great many other types of pilot flow control valves can be used. It also will be apparent that the particular kinds of variable orifices herein disclosed are not essential to the operation of the invention and that any equivalent and well-known orifice arrangements can be substituted for them. Accordingly the scope of protection to be afforded the invention is to be determined by the appended claims rather than by the foregoing disclosure. Also, it will be evident that although the flow-proportioning and flow control valve assemblies are disclosed as being in the supply to the pilot valve either or both might equally well be inserted in either of the motor control lines between the pilot valve and motor or in a single exhaust line connected to both exhaust ports of the pilot valve.

It will be understood that any changes in details of structural arrangement, such as type of pilot valve, arrangement of flow-proportioning assembly, and mechanism for applying the control signal to the latter may be resorted to without departing from the invention as defined by the appended claims.

I claim:

1. In hydraulic control apparatus that includes a jet pipe relay comprising a pivoted jet pipe and a sensitive short stroke auxiliary piston arranged in a first cylinder and having therein a pair of distributor ports in closely axially spaced disposition and cross-connected by passages to opposite ends of the piston, means for multiplying movement of the auxiliary piston comprising; structure enclosing a second cylinder having its axis displaced from that of the first cylinder, a long stroke second piston in said second cylinder, an element angularly movable about an axis extending transverse to the axes of said cylinders and spaced laterally of the axis of the second cylinder in the direction of the axis of the first cylinder, lever arm means secured to said angularly movable means and extending therefrom toward the axes of said cylinders, and links connecting said pistons to said lever arm means, said cylinders having their ends in communication in arrangement for applying force to said lever arm means in corresponding directions to move said angularly movable means.

2. Means in accordance with claim 1, wherein said cylinders are arranged with their axes parallel and in laterally spaced relation, and the angularly movable means comprises a rotary shaft disposed transverse to the direction of said axes.

3. Means in accordance with claim 1, wherein said cylinders are arranged with their axes parallel and the cylinders in laterally and axially spaced relation, the angularly movable means comprises a rotary shaft closer to the first cylinder axis than to the second cylinder axis, said lever arm means comprises a lever extending radially from one side of the shaft in the direction of the second cylinder axis and an eccentric extending in the opposite direction, and said links connect said lever and eccentric respectively with said second and first.

4. Means in accordance with claim 1, wherein a casing encloses a chamber in communication with open inner ends of the respective cylinders, the angularly rotatable means is arranged in said chamber, and a passageway interconnects the outer ends of said cylinders.

5. Mechanism for translating degree of deflection of a pivoted jet pipe from a neutral position into a proportional degree of rotation of a shaft, comprising; structure enclosing first and second cylinders having their axes relatively displaced, an auxiliary piston axially movable in said first cylinder and having therein a pair of closely adjacent axially spaced distributor ports for receiving fluid from a pivoted jet pipe, said ports being cross-connected to opposite ends of the piston, a long stroke piston in the second cylinder, a rotary shaft arranged adjacent corresponding ends of said cylinders and laterally spaced from the axis of the second cylinder in the direction of the axis of the first cylinder, eccentric lever arm means mounted on said shaft and extending therefrom in the direction of the axes of the respective cylinders, and links connecting said piston to said lever arm means.

6. Means for proportioning volume flow rate of a controlled fluid to degree of deflection of a pivoted jet pipe from a neutral position, comprising; structure enclosing first and second cylinders having their axes relatively displaced and having adjacent inner ends, a sensitive short stroke auxiliary piston axially movable in said first cylinder and having therein a pair of closely adjacent axially spaced distributor ports for receiving fluid from a pivoted jet pipe, said ports being cross-connected to opposite ends of the piston, a pilot valve connected in the flow path of the controlled fluid and including a movable body mechanically linked to said auxiliary piston and arranged for controlling flow of the fluid by its position, a long stroke piston axially movable in said second cylinder, a rotary shaft arranged adjacent the inner ends of said cylinders and laterally spaced from the axis of the second cylinder in the direction of the axis of the first cylinder, eccentric lever arm means extending laterally from said shaft in the directions of the axes of said cylinders, links respectively connecting said pistons to said lever arm means, passageways connecting the corresponding ends of said cylinders, a flow rate-proportioning device connected in the flow path of the control fluid in series with said pilot valve, said device having a control element displaceable from a neutral position and means arranged to accurately proportion flow rate of the control fluid to degree of such displacement, and mechanism interconnecting said rotary shaft and control element for maintaining a predetermined proportional relation between magnitudes of their movements.

7. Means for proportioning volume flow rate of a controlled fluid to degree of deflection of a pivoted jet pipe from a neutral position, comprising; structure enclosing first and second cylinders having their axes relatively displaced and having adjacent inner ends, a sensitive short stroke auxiliary piston axially movable in said first cylinder and having therein a pair of closely adjacent axially spaced distributor ports for receiving fluid from a pivoted jet pipe, said ports being cross-connected to opposite ends of the piston, a pilot valve connected in the flow path of the controlled fluid and including a movable body mechanically linked to said auxiliary piston and arranged for controlling flow of the fluid by its position, a long stroke piston axially movable in said second cylinger, a rotary shaft arranged adjacent the inner ends of said cylinders and laterally spaced from the axis of the second cylinder in the direction of the axis of the first cylinder, eccentric lever arm means extending laterally from said shaft in the directions of the axes of said cylinders, links respectively connecting said pistons to said lever arm means, passageways connecting the corresponding ends of said cylinders, a variable orifice assembly including a body movable to vary the area of an orifice connected in series with said pilot valve, mechanism interconnecting said rotary shaft and orifice assembly movable body for varying the area orifice in proportion to distance of movements of said pistons and of deflection of said jet pipe from its neutral position, and means for varying the volume flow rate of the controlled fluid in proportion to the area of said variable orifice.

8. Means for proportioning rate of travel of a fluid-operated servo piston in accordance with degree of deflection of a pivoted jet pipe from a neutral position, comprising; a four-way pilot valve including supply and exhaust ports connected to opposite sides of said servo piston and an axially movable body arranged to select by its position the connection to a fluid supply line and to exhaust of the opposite sides of said piston, structure enclosing a first cylinder and a second cylinder having their axes relatively displaced and having relatively adjacent inner ends, a sensitive short stroke auxiliary piston axially movable in said first cylinder and having therein a pair of closely adjacent axially displaced distributor ports for receiving fluid from a pivoted jet pipe, said ports being cross-connected to opposite ends of the auxiliary piston, means mechanically connecting said auxiliary piston and pilot valve body through the outer end of said first cylinder, a long stroke piston axially movable in said second cylinder, a rotary shaft arranged adjacent the inner ends of said cylinders and laterally spaced from the axis of the second cylinder in the direction of the axis of the first cylinder, eccentric lever arm means extending laterally from said shaft in the directions of the axes of said cylinders, links respectively connecting said pistons to said lever arm means at different radial distances from the shaft axis, passageways connecting the ends of the pistons that correspond with respect to directions of piston movement to rotate the shaft through said links and lever arm means, a variable orifice assembly including a body movable to vary the area of an orifice connected in series with said pilot valve, mechanism interconnecting said rotary shaft and orifice assembly body for proportioning area of the orifice to degree of deflection of the jet pipe from its neutral position, valve means connected in series with said pilot valve and variable orifice, and means sensitive to pressure differential across said orifice arranged to operate said valve means to maintain such pressure differential constant by varying the volume flow rate.

9. A control system for a reversible hydraulic motor comprising a primary control valve displaceable from a zero position in directions and degrees respectively corresponding to sense and magnitude of a signal, said valve being connected in a fluid flow line between a source of supply and an exhaust to supply fluid to and exhaust said motor in a sense to drive it in a direction corresponding to sense and direction of such a signal and valve, and means for adjusting rate of flow of fluid supplied to said motor to a preselected proportional relation to degree of displacement of said valve from its zero position, comprising a variable orifice device connected in said fluid flow line in series with said motor and valve and having a movable control device connected with said valve to maintain the effective cross sectional area of the orifice provided by said device proportional to degree of displacement of said valve from its zero position, and pressure differential control means arranged to maintain pressure drop across said orifice substantially at a selected magnitude.

10. Means for controlling fluid flowing in a defined flow path to accurately proportion said flow rate to the magnitude of a signal, comprising a primary flow control device having a control member to which such a signal is applied and movable from a zero position a distance that is proportional to magnitude thereof, a variable orifice device having relatively fixed and movable elements together defining a flow-restricting orifice that is interposed in said path and the area of which is variable by relative movement of said elements, and said orifice device having a control member that is movable to relatively move said elements, mechanical means coupling the control members of said primary and orifice devices for moving said member of the latter distances that are proportional to movements of said member of the former, a flow rate-adjusting device connected in said path in series with said orifice and primary control devices and having a control member that is movable to vary the volume flow rate of fluid in said path, means for detecting a differential pressure across said orifice device, and mechanism controlled by the last said means for moving said flow rate adjusting device control member to maintain such differential substantially constant.

HERBERT ZIEBOLZ.

References Cited in the file of this patent

UNITED STATES PATENTS

| Number | Name | Date |
|---|---|---|
| 2,135,157 | West | Nov. 1, 1938 |
| 2,272,684 | Vickers | Feb. 10, 1942 |
| 2,316,926 | Willett | Apr. 20, 1943 |

FOREIGN PATENTS

| Number | Country | Date |
|---|---|---|
| 19,980 | Great Britain | 1908 |
| 181,402 | Great Britain | June 12, 1922 |